(No Model.)
T. HUSTER.
CASTER.
No. 346,161. Patented July 27, 1886.
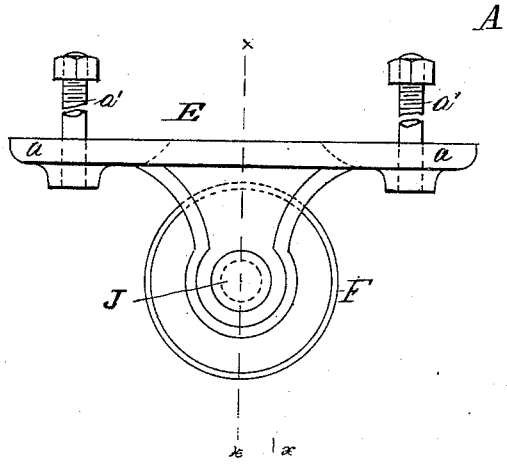
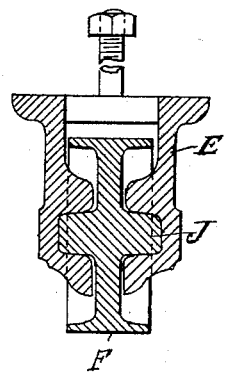
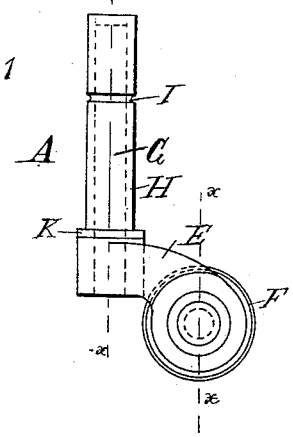
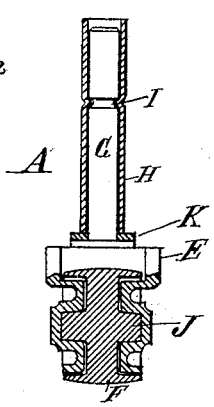
Witnesses
Fred J. Warner
Jennie Inglis
Inventor
Theodore Huster
John Inglis atty

UNITED STATES PATENT OFFICE.

THEODORE HUSTER, OF PATERSON, NEW JERSEY.

CASTER.

SPECIFICATION forming part of Letters Patent No. 346,161, dated July 27, 1886.

Application filed April 7, 1886. Serial No. 198,082. (No model.)

*To all whom it may concern:*

Be it known that I, THEODORE HUSTER, a citizen of the United States, residing at Paterson, Passaic county, State of New Jersey, have invented a new and useful Improvement in Casters, of which the following is a specification, reference being had to the accompanying drawings, forming a part thereof.

The object of my invention is that the caster-roller be inclosed and operative in the caster-frame, which is cast whole or in one piece around the roller in the mold, and that the shank of the caster and its core or shell be made inseparable, so that the shell may revolve around the shank, and the shank revolve within its shell.

The invention consists in a specific construction and a modification thereof, hereinafter fully set forth; but that the invention may be better understood I will, by the aid of the accompanying drawings, proceed more fully to describe the same.

Figure 1 shows one side of my invention in elevation, and Fig. 2 shows the same in cross-section, taken on lines $x$ $x$ of Fig. 1.

A represents a caster for general use, the frame of which, with its shank, is made or cast whole or in one piece, with the caster-roller inclosed. The frame of the caster, with its shank G, which has a circumferential groove, I, formed therein, is formed or molded in the sand by means of suitable forms or patterns that are prepared therefor.

The roller F of the caster A is suitably placed in position within the molded form of the frame E preparatory to the cast. After this is done, melted metal is poured into the mold in the usual way, and forms around the roller F and axles J, inclosing the roller in the frame E, so cast whole or in one piece in the mold.

The shank G of the caster A is provided with a sheet-metal case or shell, H, which shell is, by means of a suitable appliance, acted upon forcibly, which causes the shell or case H to conform to the groove I in the shank G, which action connects inseparably the shank G and its case or shell H. The shell H and shank G, while the same are inseparably united, are free to revolve, the shell around the shank and the shank within the shell.

The shank of the caster A is provided with a washer, K, while the sides of the frame E, which conform to the shape of the roller F, act as scrapers to prevent the accumulation of dirt on the roller.

My invention may be made or cast of any suitable material or materials that are adapted to such use, and of all sizes required for the various positions where casters are employed.

Fig. 3 shows in elevation, and Fig. 4 in cross-section, a modification of my improvements adapted particularly to trunks, the shank, case, and washer being dispensed with, the frame having extensions $a$, in which extensions are cast securing-bolts $a'$, by which to secure the frame E to the trunk.

Having described my invention, I claim as new—

The combination, with the caster-frame E, cast in one piece around the caster-roller, said frame having shank G, and groove I, formed therein, of the roller F, shell H, and washer K, substantially as described and shown.

THEODORE HUSTER.

Witnesses:
 FRED I. WARNER,
 JOHN INGLIS.